INVENTORS
JOHN C. HOVEKAMP &
EDWARD J. RUSSELL, JR.
BY
ATTORNEYS

July 20, 1965 J. C. HOVEKAMP ETAL 3,195,451
DECORATING MEANS
Filed Sept. 11, 1962 10 Sheets-Sheet 5

INVENTORS
JOHN C. HOVEKAMP &
EDWARD J. RUSSELL, JR.
BY
ATTORNEYS

July 20, 1965   J. C. HOVEKAMP ETAL   3,195,451
DECORATING MEANS

Filed Sept. 11, 1962   10 Sheets-Sheet 6

INVENTORS
JOHN C. HOVEKAMP &
EDWARD J. RUSSELL, JR.

ATTORNEYS

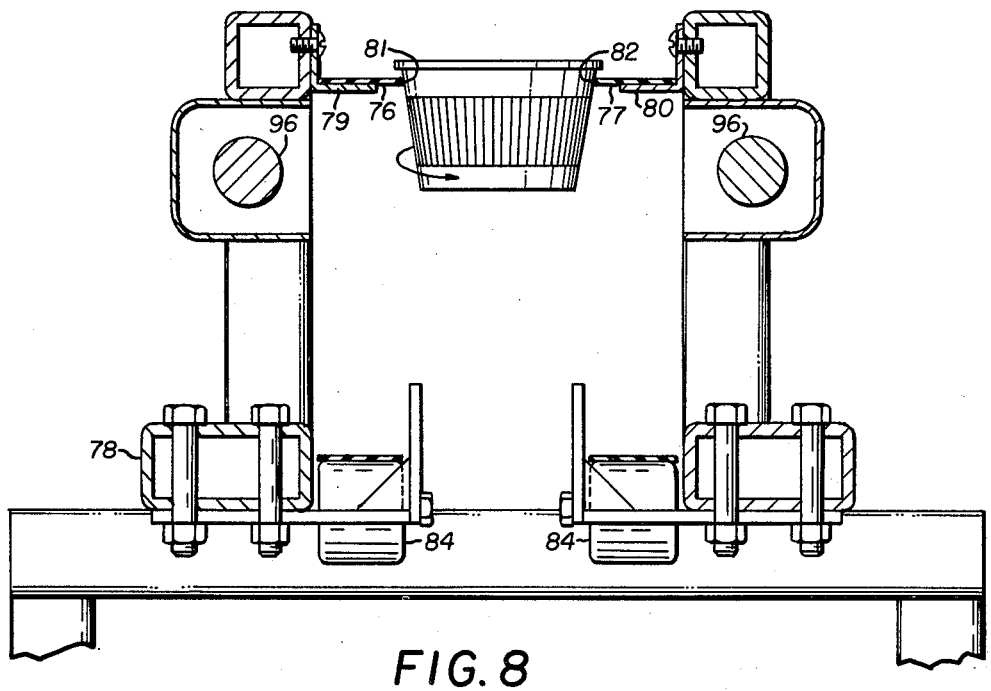
FIG. 8
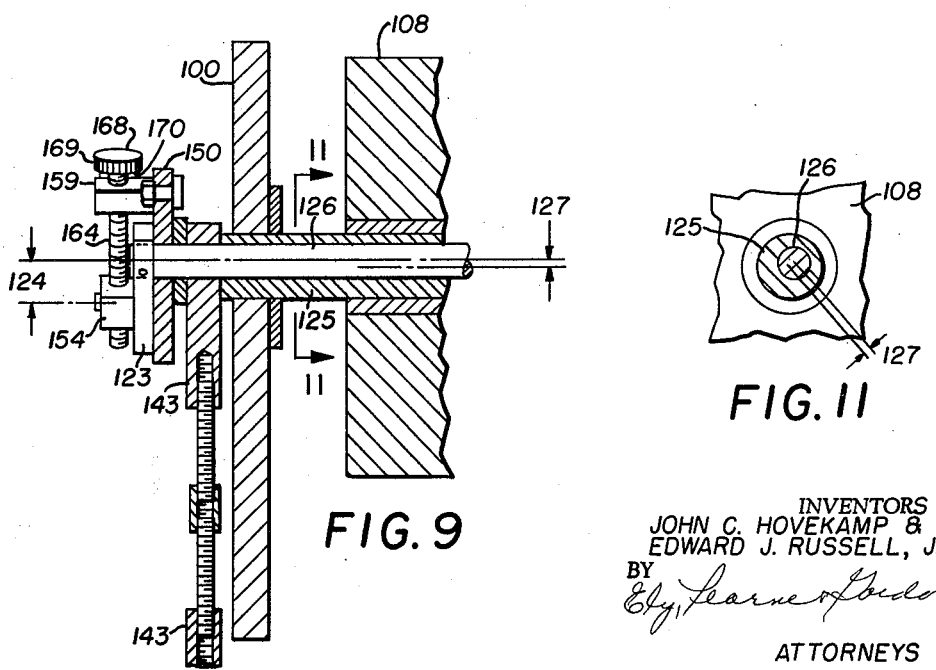
FIG. 9
FIG. 11
INVENTORS
JOHN C. HOVEKAMP &
EDWARD J. RUSSELL, JR.
BY
ATTORNEYS

INVENTORS
JOHN C. HOVEKAMP &
EDWARD J. RUSSELL, JR.

ATTORNEYS

United States Patent Office 3,195,451
Patented July 20, 1965

3,195,451
DECORATING MEANS
John C. Hovekamp, Elyria, and Edward J. Russell, Jr., Sandusky, Ohio, assignors to Kamru Products Corporation, Elyria, Ohio, a corporation of Ohio
Filed Sept. 11, 1962, Ser. No. 222,853
10 Claims. (Cl. 101—38)

This invention relates to the decoration of workpieces and more particularly to apparatus for accomplishing such decoration.

This application is a continuation-in-part of our copending application Serial No. 848,156, filed October 22, 1959, now abandoned.

In one broader aspect of the invention, the workpieces to be decorated may comprise any articles which, in permanent or transitory condition, have a printable surface which is a surface of revolution.

In more particular aspects of the invention, it is contemplated that the workpieces will comprise annular members. Particularly important is the contemplated decoration of annular containers having tapered sides.

An object of this invention is to provide means for printing highly definitive markings on the exterior side walls of hollow containers.

A further object of this invention is to provide means for printing such markings at a printing station and for intermittently and rapidly conveying workpieces to and from the printing station at a rate of at least hundreds per minute.

Another object of this invention is to accomplish the decoration of workpieces by imprinting apparatus having form rolls which may be maintained continuously wet to thus save the time otherwise involved in redissolving ink on the form rolls after even momentary stopping of the apparatus.

These and other objects, features, and advantages of the invention will become apparent and more fully understood from the following detailed description of the invention and the accompanying drawings in which:

FIGURE 8 is a fragmentary cross-sectional detail view taken from the line 8—8 of FIGURE 1;

FIGURE 9 is a fragmentary cross-sectional detail view taken from the line 9—9 of FIGURE 4;

FIGURE 11 is a cross-sectional detail view taken from the line 11—11 of FIGURE 9;

Figure 1:
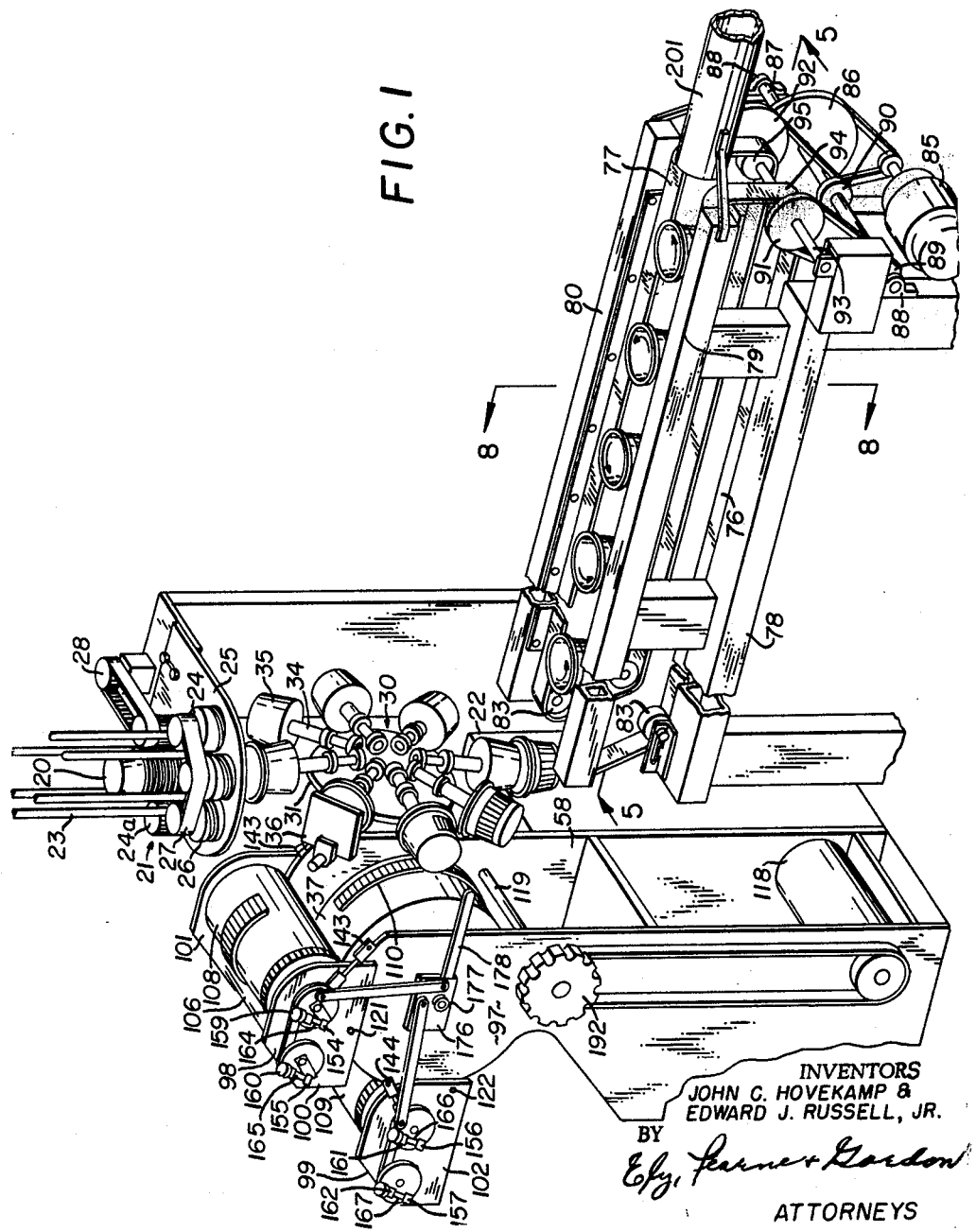
FIGURE 1 is a partly schematic trimetric view of the decorating apparatus embodying this invention.

In the following description, various elements will be designated by reference numerals and, in many instances, the figures in which those parts may be most conveniently found will be designated parenthetically. For example, when reference is made to a "base frame 22 (1, 2, 4)," the part or parts in question are indicated by the reference numeral 22 in the drawings and may be most conveniently found or clearly seen in FIGURES 1, 2 and 4.

Container feed mechanism

Workpieces such as blank cups 20 are positively fed into the decorating apparatus by a feed mechanism 21 (1, 2, 4, 16). The feed mechanism 21 is fixed to and mounted above a base frame 22 (1, 2, 4) of the decorating apparatus and includes a plurality of vertically extending rods 23 (1, 2, 4, 16) and a plurality of screw feed cylinders 24 (1, 2, 4, 16). The rods 23 are mounted on an adjustable supporting plate 25 (1, 2, 4, 16) to define a vertical cylindrical chute for the cups 20. The feed cylinders 24 are rotatably mounted on the plate 25 to extend slightly into the cylindrical chute defined by the rods 23, as may be seen more clearly in FIGURE 16. Each feed cylinder 24 is provided on its periphery with a screw thread 26 (1, 2, 4, 16) which has a pitch equal to the axial length of the cylinders 24. The feed cylinders 24 are driven in unison by a common belt 27 (1, 2, 4) which encircles in driving relationship a neck portion 24a of each feed cylinder 24. The belt 27 is driven by a pulley 28 (1) which, in turn, is driven by a suitable drive means (not shown).

Figure 16:
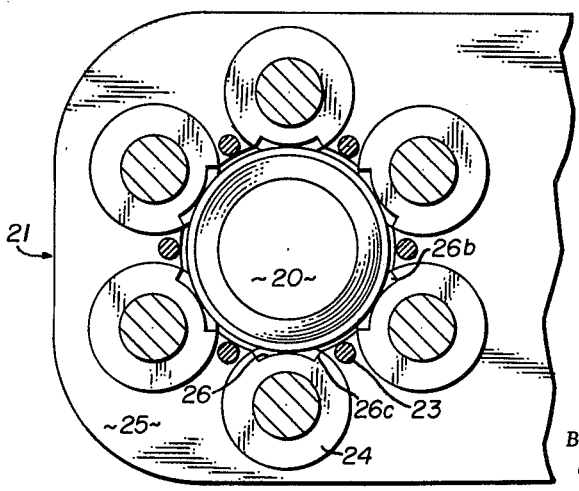
FIGURE 16 is a cross-sectional detail view taken from the line 16—16 of FIGURE 2.

As is apparent in FIGURE 16, the screw threads 26 are cut into each of the cylinders 24 a distance which is slightly greater than the radial width of the beaded rim of a cup 20. Each screw thread 26 has downwardly and upwardly facing, helical surfaces 26a (2, 4) and 26b (2, 4, 16), respectively. The downwardly facing surface 26a intersects the top surface of the feed cylinders 24 at an acute angle to define a knife edge 26c (4, 16) therewith.

The feed cylinders 24 rotate in a counterclockwise direction, as viewed in FIGURE 16, and when they simultaneously assume the position indicated in that figure, the vertical stack will drop a short distance and will be supported by the upwardly facing surfaces 26b. Upon further rotation of the feed cylinders 24, each knife edge 26c will simultaneously pass above the rim of the lowermost cup and below the rim of the penultimate cup to positively propel a single cup downwardly. As the lowermost cup 20 on the vertical stack is selectively separated and conveyed into the machine, the other cups are supported by the top surface of each of the feed cylinders 24. Obviously, the number of cups per unit time that are fed into the machine is equal to the number of revolutions per unit time at which the feed cylinders 24 are driven.

Indexing turret

In indexing turret 30 (1, 2, 4) is provided below the feed mechanism 21. The indexing turret 30 includes a spacing plate 31 (1, 2, 3, 3A, 4, 7) which is keyed to an intermittently driven shaft 32 (2, 3, 3A). The shaft 32 is intermittently driven by a suitable indexing mechanism 33 (2) to rotate the plate with a step-by-step movement. This movement will be described in detail below.

Figure 2:
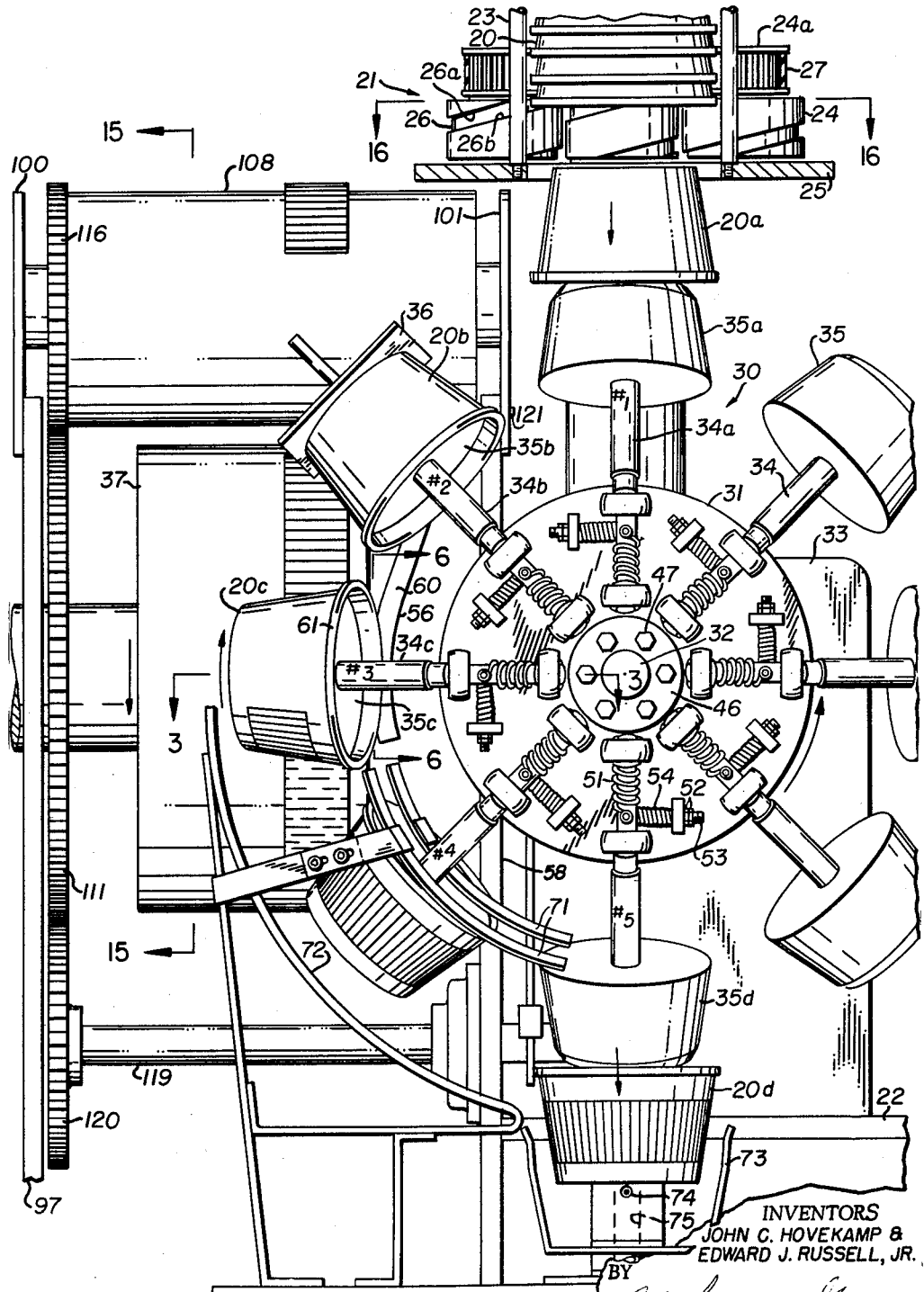
FIGURE 2 is a partial front elevation of the apparatus illustrated in FIGURE 1 showing the indexing turret and some of the elements of FIGURE 1.

A multiplicity of radially extending, diametrically opposed arbors 34 (1, 2, 3, 3A, 4, 5, 6) are mounted on the plate 31 in a manner which will hereinafter be explained. As may be seen most clearly in FIGURE 2, the arbors 34 are shown in a dwell position. An arbor head 35 (1, 2, 3, 3A, 4, 5) is rotatably mounted at the distal end of each arbor 34. The arbors 34 are rapidly advanced in a counterclockwise direction to an adjacent indexed position. As is shown in FIGURE 2, a cup 20a has been discharged from the feed mechanism 21 and is about to drop onto an arbor head 35a of an indexed arbor 34a. The arbor 34a is shown to be indexed so that its axis is in a vertical plane which passes through the axes of the feed chute and the shaft 32. In this location a cup which is driven from the feed chute will nest over the arbor head 35a.

A second indexed arbor 34b (2) is shown in an indexed position at a cup securing station. At this station, a cup 20b is tamped securely onto an arbor head 35b by a tamping plate 36 (1, 2, 4). The tamping plate 36 is actuated by a suitable linkage mechanism (not shown) which causes the plate 36 to pat or tamp each cup 20 when it is dwelling at an indexed position at this station.

A third indexed arbor 34c (2) is shown in an indexed position at a cup printing station. At this station, a cup 20c is being decorated by a main cylinder or roll 37 (1, 2, 3, 3A, 4, 15). The axis of the main printing roll 37 is perpendicular to the axis of the shaft 32 and these axes define a horizontal plane. In the indexed printing position the axis of an arbor 34 also lies in this horizontal plane.

Figure 3:
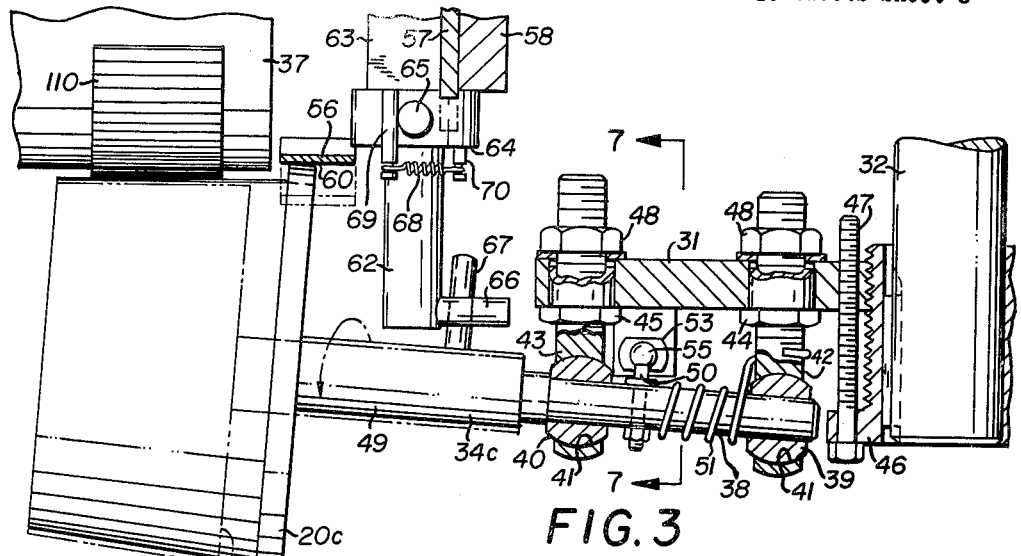
FIGURE 3 is a fragmentary cross-sectional detail view taken from the line 3—3 of FIGURE 2.
Figure 3A:
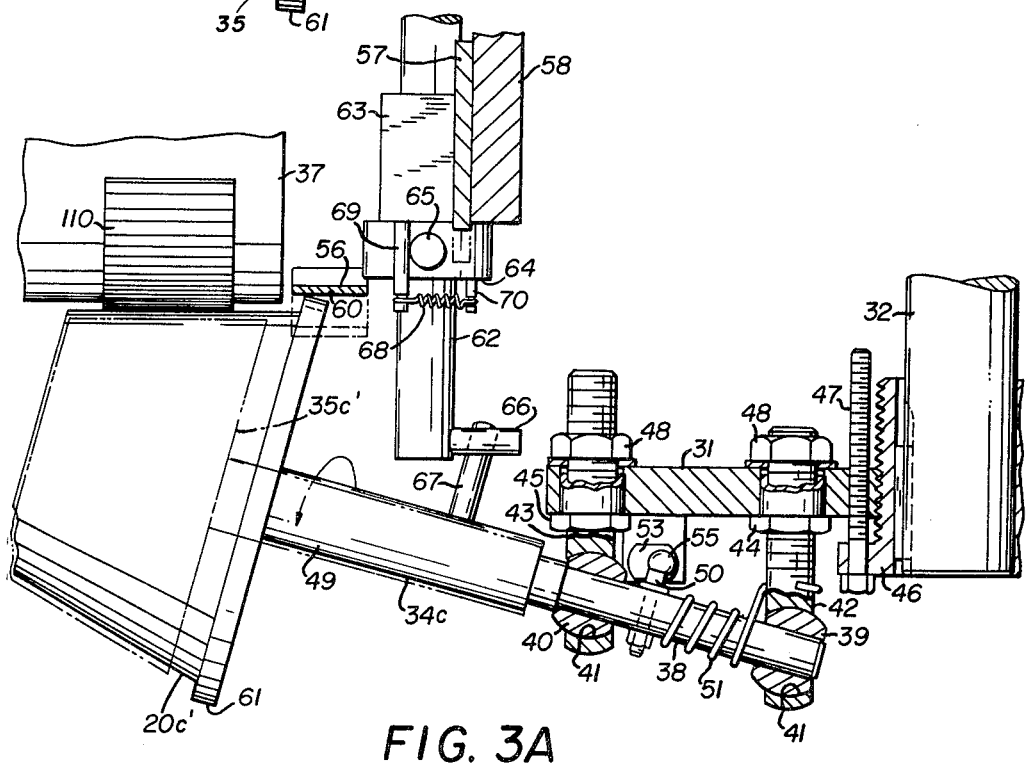
FIGURE 3A is a fragmentary cross-sectional detail view similar to FIGURE 3 showing an arbor carrying a different workpiece.

As is shown in FIGURES 3 and 3A, each arbor 34 is adjustably secured to the spacing plate 31 so that the outside face of a cup 20 will be in uniform contact with the printing portion of the main printing roll 37 with proper allowance for cup taper. Thus, as is shown in FIGURE 3 and 3A, a main shaft 38 of the arbor 34c is journalled in inner and outer adjustable bushings 39 and 40, respectively. The bushings 39 and 40 have spherical outer surfaces and are journaled in a matching socket 41 in inner and outer eye-bolts 42 and 43 respectively. The bolts 42 and 43 are threadedly received in radially aligned inner and outer adjusting nuts 44 and 45 which are provided in the plate 31. The adjusting nuts 44 and 45 may be rotated with respect to the plate 31.

Thus, each arbor 34 may be adjusted so that a cup 20 on an arbor head 35 and the main roll 37 are contiguous at a line common to the cup and the main roll. This linear contact relationship is established only when a cup is dwelling at an indexed position at the printing station. Since the axes of the main roll 37 and the arbor 34c indexed and dwelling at the printing station lie in a common horizontal plane, the line of contact between the main roll 37 and a cup 20c on the arbor 34c indexed at the printing station also lies in this common horizontal plane.

Each arbor 34 may be individually adjusted to establish this linear contact by turning the inner and outer adjusting nuts 44 and 45 in a clockwise or counterclockwise direction to draw the inner and outer eye-bolts 42 and 43 either into or out of the plate 31. In FIGURE 3A a cup 20c' is shown in the previously described linear contact with the main roll. The cup 20c' has a greater side wall taper than the cup 20c illustrated in FIGURE 3. To accommodate the cup 20c', an arbor head 35c' is provided which has a tapering surface which is complementary to that of the cup 20c'. The arbor 34c is adjusted from the position shown in FIGURE 3 to the position shown in FIGURE 3A by turning the outer adjusting nut 45 in a counterclockwise direction to draw the outer eye-bolt 43 into the plate 31 and by turning the inner adjusting nut 44 in a clockwise direction to draw the inner eye bolt 42 out of the plate 31. As the adjusting nuts 44 and 45 are being turned in this manner, the bushings 39 and 40 will turn within their sockets 41 and the axis of the main shaft 38 of the arbor 34 will change its angular position relative to the axis of the eye-bolts 42 and 43 and the plane of the spacing plate 31.

In some instances it may be necessary to adjust the plate 31 either inwardly or outwardly with respect to the driven shaft 32. As is shown in FIGURES 2, 3, and 3A, an externally threaded bushing 46 is keyed to the driven shaft 32. This bushing 46 is threaded into a central aperture in the plate 31 and is fixed with respect to the plate by a plurality of bolts 47 which are threaded through a flanged portion of the bushing 46 and through the plate 31. The plate 31 is adjusted inwardly or outwardly with respect to the shaft 32 by removing the bolts 47 and rotating the shaft 32 and the bushing 46 in a clockwise or counterclockwise direction. When the desired position of the plate 31 is achieved, the bolts 47 are reinserted through the flange portion of the bushing 46 and through the plate 31.

When the arbors 34 are adjusted so that the cup 20 will engage the main roll 37 to establish the previously described linear contact, jam nuts 48 are threaded onto the ends of the eye bolts 42 and 43 to maintain the selected position.

Figure 7:
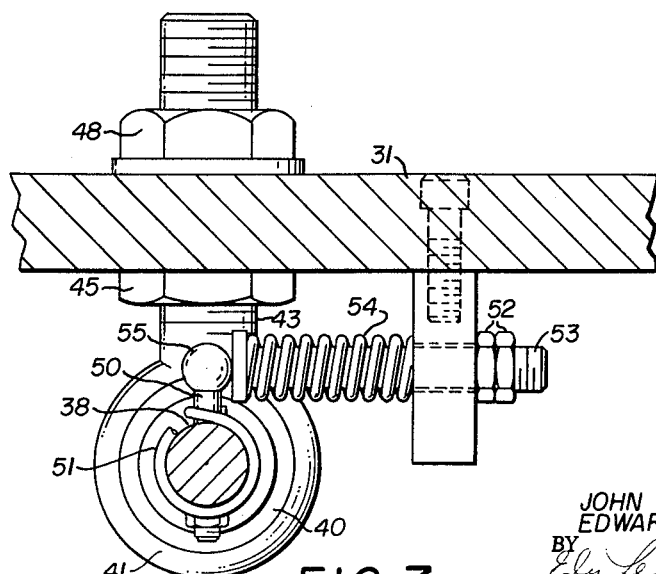
FIGURE 7 is a fragmentary cross-sectional detail view taken from the line 7—7 of FIGURE 3.

As may be seen in FIGURES 3 and 3A, the main shaft 38 of each arbor has an enlarged end portion 49 which is eccentrically located with respect to the axis of the main shaft 38. The arbor heads 35 are mounted for rotation about each end portion 49 by suitable bearings (not shown). When a cup contacts the main roll 37, the cup and its associated arbor head 35 will be driven by the main roll and, consequently, the cup will be decorated. The eccentricity of the shaft end portion 49 permits the printing pressure between the cup and the main roll to be precisely adjusted. To this end, a pin 50 (3, 3A, 7) is provided in the shaft 38 between the bushings 39 and 40. The pin 50 extends in the direction of a line which passes through and is perpendicular to the relatively eccentric axes of the shaft 38 and the end portion 49. With the pin 50 in the positions shown in FIGURES 3, 3A, and 7, the eccentric end portion 49 and therefore the arbor head 35 are positioned as closely as possible to the main roll 37. The cup pressure against the main roll may be reduced by moving the pin 50 in a counterclockwise direction as is shown in FIGURE 7 against the bias of a relatively weak spring 51 circumjacent the main shaft 38 or the arbor 34 (2, 3, 3A, 7). This is accomplished by loosening a pair of lock nuts 52 (2, 7) on an adjustable push rod 53 (2, 3, 3A, 7) and permitting a relatively strong spring 54 (2, 7) to move the rod 53 to the left against the head 55 of the pin 50, rotating the pin 50 counterclockwise as viewed in FIGURE 7. It should be appreciated that the cup pressure against the main roll 37 may be reduced by adjusting the pin 50 in a clockwise direction but, for reasons which will hereinafter become apparent, the pin 50 should not be adjusted in this manner. Stated differently the pin 50 as viewed in FIGURE 7 should not be adjusted so that a head 55 of the pin 50 will be positioned to the right of the position therein indicated.

A cup sensing mechanism is provided between the cup tamping and cup printing stations. As may be seen particularly in FIGURES 2, 3, 3A, and 6, the cup sensing mechanism includes a cup sensing arm 56 which is fixed to a pivoted locking plate 57. The plate 57 is journaled on a slotted shaft 59 which is secured to the slide support plate 58.

The cup sensing arm 56 has a flat face 60 which extends for a distance both above and below an arbor head 35c which is indexed and dwelling at the printing station. The arm 56 is positioned so that its face 60 will strike the lip or upper edge portion 61 of a cup 20 as that cup travels from the cup tamping station to a location which is slightly beyond the printing station.

Figure 6:
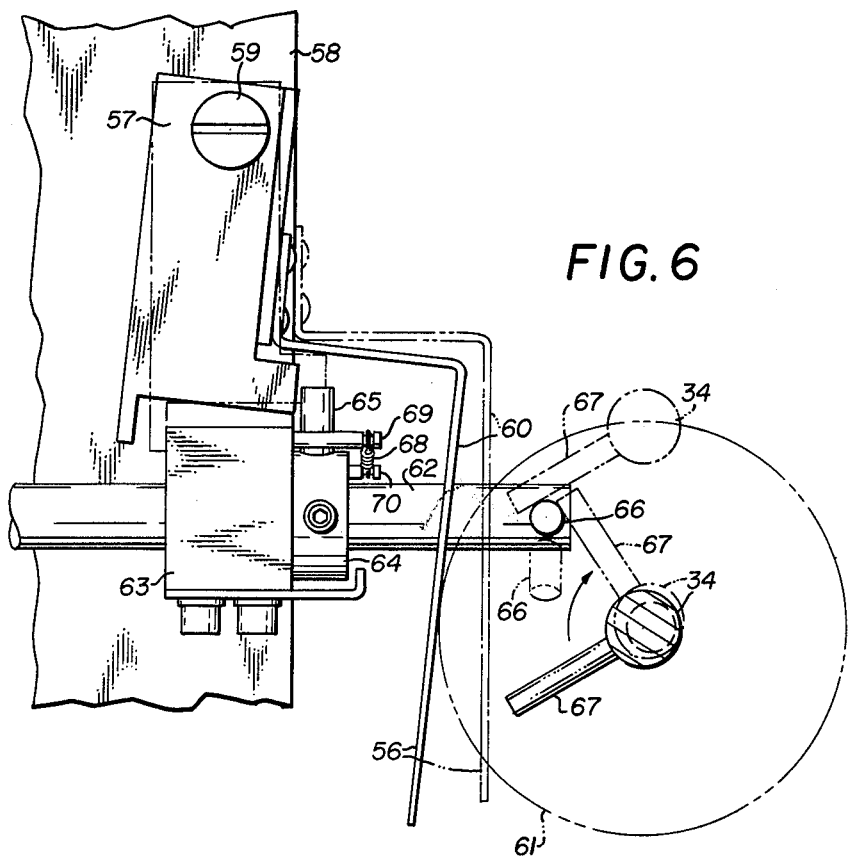
FIGURE 6 is a fragmentary cross-sectional detail view taken from the line 6—6 of FIGURE 2.

An arbor trip shaft 62 (3, 3A, 6) is journaled for rotation in a bearing block 63 (3, 3A, 6) which is fixed to the side support plate 58 beneath the locking plate 57. A collar 64 having an upwardly extending dowel pin 65 is fixed to the trip shaft 62. The extremity of the shaft 62 is provided with a trip pin 66 which, as may be seen in FIGURE 6, is positioned to contact a dog 67 fixed to each eccentric portion 49 of the shafts 38. The dowel pin 65 and its associated trip shaft 62 are normally biased to the position shown in FIGURES 3, 3A, and 6 by a relatively weak spring 68 which extends from a pin 69 fixed to the bearing block 63 to a pin 70 fixed to the collar 64.

If a cup is properly positioned on an arbor head 35 as the cup and arbor head are indexed from the cup tamping station to the cup printing station, the upper edge portion 61 of the cup will strike the flat face 60 of the cup sensing arm 56. The cup sensing arm 56 will thereby be pushed from its normal position, which is shown in phantom outline, to the position indicated by the solid lines in FIGURES 3, 3A, and 6. This pushing action by the cup will swing the locking plate 57 in a clockwise direction from the position shown in phantom outline to the solid line position shown in FIGURES 3, 3A, and 6. As an arbor 34 approaches the printing station the downwardly extending dog 67 will strike the trip pin 66. Since the shaft 38 and its eccentric end portion are biased by the relatively strong spring 54, the dog 67 will remain in its downwardly extending position. Since the trip shaft 62 and its collar 64 are biased by the relatively weak spring 68, the trip pin 66 is pushed downwardly to the position shown in phantom outline in FIGURE 6, thereby causing the shaft 62 to rotate in the bearing block 63. The retracted locking plate 57 permits the dowel pin 65 to pass.

If, on the other hand, a cup is not on an arbor head 35 as the arbor head is indexed from the cup tamping station to the cup printing station, it is necessary to prevent the arbor head 35 from contacting and being decorated by the main roll. In this respect, it should be appreciated that, if ink is transferred from the main roll to the surface of an arbor head, the cups which are later fed onto that harbor head would be spoiled, since ink would be transferred to the inside surface of those cups by the decorated arbor head. If a cup is not on an arbor head 35, therefore, the cup sensing arm 56 will remain in the position indicated in phantom outline, since the face 60 of the arm 56 will not be pushed by the lip or upper edge portion 61 of a cup. As the arbor 34 approaches the printing station the downwardly extending dog 67 will strike the trip pin 66. Since the locking plate 57 is in the locking position indicated in phantom outline, the dowel pin 65 and the shaft 62 are prevented from rotating and the trip pin 66 remains in a fixed position. When the arbor approaches the printing station and the downwardly extending dog 67 strikes the fixed trip pin 66, the dog 67 is forced upwardly in the direction of the arrow in FIGURE 6 to cause the shaft 38 to rotate within the bushings 39 and 40 about its own axis. The axis of the eccentric end portion 49 of the shaft 38 will consequently rotate about the axis of the shaft 38 and cause the eccentric portion 49 and its axially mounted arbor head 35 to swing away from the main roll 37. The arbor head 35 will therefore dwell at the printing station in a position which is spaced slightly away from the main roll 37, as is shown in phantom outline in FIGURES 3 and 3A. This spaced relationship continues for a short period as the arbor 34 is being indexed from the printing station to insure that the arbor head 35 will not contact the main roll 37.

As was previously explained, the pin 50 should not be adjusted so that its head 55 will be positioned to the right of the position indicated in FIGURE 7. If the pin 50 were so adjusted, the eccentric portion 49 of the shaft 38 and its associated arbor head 35 would swing toward, instead of away from, the main roll 37 upon rotation of the shaft 38.

After the dwell period at the printing station, each arbor 34 is in turn indexed to a cup removing station where the upper lip 61 of each cup is engaged by a pair of cup removing cam plates 71 (2). The cam plates 71 are located on either side of the line of travel of the end portions 49 of the shafts 38 to permit each end portion 49 to pass freely between the plates 71. The plates 71 define a curved surface which approaches the path of the arbor heads 35 as they pass beneath the plates 71. As each arbor head 35 is indexed from the cup removing station to a cup discharge station, the inner surface of each arbor head approaches the cam plates 71 and each cup is pried from its position on the arbor head 35 in a controlled manner. As each cup is pried from its arbor head 35, the cup drops a short distance onto a slide bed 72 (2). The bed 72 has a cup engaging surface which is an arc of circle having its center located on the axis of the shaft 32. The bed 72 supports the cups after they have been released from frictional engagement with the arbor heads 35 and permits them to be moved by the indexing arbor heads 35 until the arbor head 35 is indexed to and dwelling at the cup discharge station. The cup drops into a cup discharge trough 73 (2, 5) which is located below the arbor 34 dwelling at the discharge station at the same moment that a cup is being fed onto the arbor 34 which is dwelling at the feed station. This relationship is shown in FIGURE 2. In that figure, a cup 20d is shown to be dropping from an arbor head 35d simultaneously with the dropping of the cup 20a onto the arbor head 35a.

*Discharge conveyor and ink drying mechanism*

As soon as a cup has dropped into the trough 73, it is struck by a jet of air from a nozzle 74 (2, 5). The nozzle 74 communicates with an air tube 75 (2, 5) which in turn is connected to a source of pressurized air (not shown). Air is blown through the nozzle 74 at a suitable pressure and for a period of time sufficient to drive the cup to the position shown in phantom outline in FIGURE 5. The timing of each air blast is dependent upon the angular velocity of the turret and each air blast is periodically actuated by a button valve (not shown) which is operated by suitable cams (not shown) fixed to the plate 31.

Figure 5:
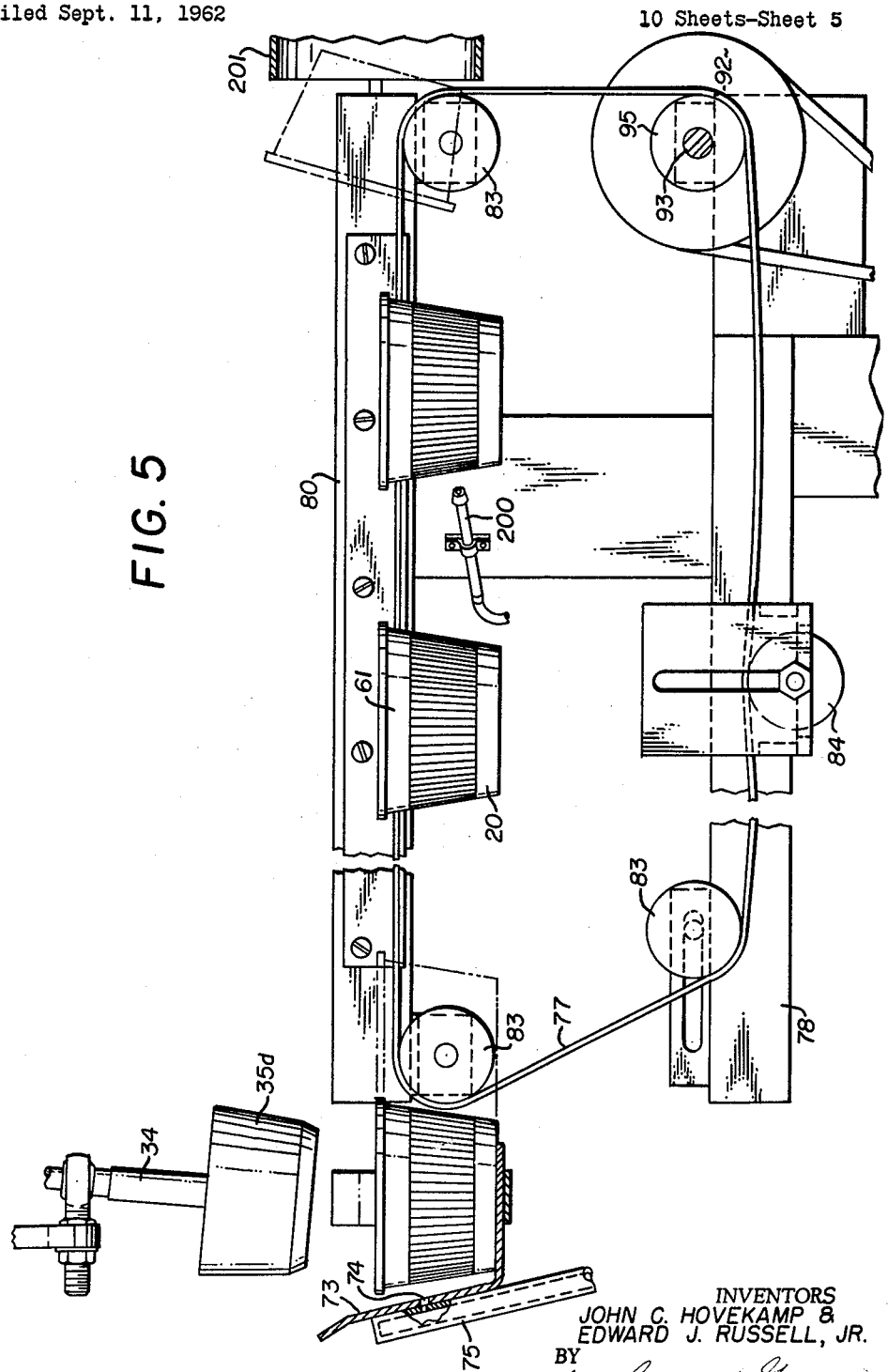
FIGURE 5 is a fragmentary cross-sectional detail view taken from the line 5—5 of FIGURE 1.

When each cup is driven by the air blast to the position shown in phantom in FIGURE 5, the lip 61 of the cup or the upper side wall thereof is engaged by a pair of conveyor belts 76 and 77 (1, 5, 8), respectively.

The conveyor belts 76 and 77 are endless belts which are mounted on a conveyor frame 78 (1, 5, 8) that extends prependicular to the spacing plate 31. Each belt 76 and 77 has an upper reach which runs on spaced supports or tracks 79 and 80, respectively. As may be seen in FIGURE 8, each belt 76 and 77 extends inwardly beyond its own track 79 and 80, respectively, and each belt has an inner edge 81 and 82, respectively, which engages the tapered side wall or lip 61 of the cup 20. The belts 76 and 77 are each threaded around idler pulleys 83 which are rotatably mounted on the conveyor frame 78. To regulate the tension of the belts 76 and 77, each belt is provided with a regulating pulley 84 (5, 8) which may be vertically adjusted to increase or decrease the belt tension.

The belts 76 and 77 are driven at different linear speeds. This may be accomplished in the following manner. A variable speed motor 85 (1) is mounted on the conveyor frame 78. The motor 85 drives a pulley 86 by a V-belt. The pulley 86 is fixed to a power shaft 87 which is journaled for rotation in bearings 88. Power output pulleys 89 and 90 are fixed to the shaft 87 and respectively drive a relatively small pulley 91 and a relatively large pulley 92 (1, 5). The small and large pulleys 91 and 92 are mounted for rotation on a fixed shaft 93 and respectively are keyed to and drive belt power pulleys 94 and 95 which are also mounted for rotation on the fixed shaft 93. The conveyor belts 76 and 77 are respectively driven by the pulleys 94 and 95 at different speeds due to the difference in diameter between the relatively small pulley 91 and the relatively large pulley 92.

As viewed in FIGURE 1, the pulleys 94 and 95 are driven in a clockwise direction to cause the upper reach of each belt 76 and 77 to move away from the discharge station. The belt 76 is driven by its relatively small pulley 91 at a speed which is greater than that of the belt 77. The velocity at which a cup is conveyed by the belts from the discharge station is equal to the velocity of the belt 77 plus one-half of the difference between the velocity of the belt 76 minus the velocity of the belt 77. The speed differential between the conveying belts not only conveys cups away from the discharge station at the previously explained velocity but also causes the cups to rotate in the direction indicated by the arrows in FIGURES 1 and 8. If desired, one of the belts may be stationary, or the slower of the belts may be driven in a reverse direction (as, for example, by putting one twist in the V-belt which drives the pulley 92). In any event the algebraic sum of the velocities of the two belts at their container-supporting reach should have a sign corresponding to the outgoing or away-from-turret direction.

Radiant dryers 96 (8) are mounted on the conveyor frame 78 beneath the tracks 79 and 80 to rapidly dry the ink on the containers. The dryers 96 are preferably 3.2 micron, infra red emitters which selectively dry the printed image without appreciably raising the temperature of the cup itself. The use of infra red emitters reduces the drying time of a cup to five seconds and permits the use of a relatively short conveyor frame 78. Drying means other than infra red emitters may be employed. It should be appreciated, however, that when cups are printed at a rate of at least hundreds per minute, longer drying periods require the use of a proportionately longer conveyor frame 78.

As each cup 20 approaches the end of the conveyor frame 78, it is struck by an air blast from a pair of air nozzles 200 (5). Although one nozzle 200 is shown in the drawings, it is to be understood that two nozzles 200 are provided in the illustrated apparatus. The nozzles 200 are fixed to opposite sides of the frame beneath the belts 76 and 77 and are pointed upwardly and inwardly. Each cup 20 is initially struck at its side wall by the air blast. The force of the blast against the side wall of a cup 20 causes the cup 20 to pivot in a counter-clockwise direction (as viewed in FIGURE 5) about its points of contact with the belts 76 and 77. This pivotal movement of the cup 20 will continue until the open mouth of the cup 20 presents itself to the air blast and the cup 20 is in the approximate position indicated in phantom outline at the discharge end of the conveyor frame 78, as is shown in FIGURE 5. When the air blast reaches the inside of the cup 20, the blast will propel the cup 20 from contact with the belts 76 and 77 and into a pneumatic tube 201 (1, 5). A vacuum may be provided in the tube 201 to convey the cups 20 to a remote packing station (not shown).

*Offset printing machine*

Mounted on the side support plate 58 and a side support plate 97 (1, 2, 4, 15) is a first carrier frame 98 (1, 4, 15) and a second carrier frame 99 (1, 4, 15). The carrier frame 98 comprises a pair of end plates 100 (1, 2, 4, 9, 12, 13, 15) and 101 (1, 2, 14) which are held in rigid relationship by suitable tie bars (not shown), the spacing function of which may be supplemented by the roll shaft structures to be described below and which are mounted on the carrier frame. Similarly, the second carrier frame 99 comprises a pair of end plates 102 (1, 4, 15) and a similar plate (not shown) corresponding to the plate 101 which are held in spaced relationship by suitable tie bar members (not shown).

Mounted on the carrier frames 98 and 99 are first and second fountain rolls 104 (15) and 105 (15), first and second form rolls 106 (1, 12, 14, 15) and 107 (15), and first and second plate-carrying cylinders or rolls 108 (1, 2, 9, 11, 15) and 109 (1, 15). The trains of rolls comprising on the one hand the rolls 104, 106, and 108 and on the other hand the rolls 105, 107, and 109 terminate at the single main decorating cylinder or roll 37 which includes a cylindrical ink-transferring surface of elastomeric material 110, such as molded natural or synthetic rubber or other plastics such as polyurethane or polyvinyl chloride having swelling inhibitors included therewith. The cylindrical surface of the elastomeric material 110 is preferably ground with a fine grade wheel and then "polished" with "150c grit" silicon carbide paper and finally with "320c grit" silicon carbide paper, the polishing being conducted with soapstone powder as a lubricant. The result is a fine-grained satin finish on the elastomeric surface 110 that (1) enables the main roll 37 to frictionally drive the object to be printed, such as a cup 20 or container on an arbor head 35 which has been indexed and is dwelling at the printing station in contact with the main roll 37, and (2) is compatible with fine printing definition.

The ink-transferring surface of elastomeric material 110 may be continuous or discontinuous. In the embodiment shown in the drawings, the surface is discontinuous and comprises two spaced laminae of elastomeric material 110 which are securely affixed to the main decorating cylinder or roll 37. The discontinuous arrangement of the laminae is consistent with proper printing techniques. If the surface is continuous, the workpiece may be smudged, since the workpiece would be driven into and, subsequently, out of contact with the elastomeric material. In the disclosed embodiment, the indexing turret 30 and the main roll 37 may be synchronized so that the workpieces are indexed to and from a space between the laminae and the subsequent contact between the elastomeric material and the workpiece would be rolling contact.

Associated respectively with each of the rolls 37 and 104–109 are the gears 111–117 (15) carried coaxially with the rolls and preferably having pitch diameters somewhat smaller than their associated rolls so as to allow the rolls to be varied somewhat in their spacing from each other while continuing to maintain driving interconnection between the gears, in a manner well known in the printing field. This arrangement is feasible in view of the relatively low torques transmitted by the gear trains in the printing applications in which they are employed.

Driving means are provided for the gear trains comprising the gears 111–117 including a drive, preferably explosionproof, motor 118 (1). The motor 118 drives an input shaft 119 (1, 2, 15) through a suitable speed reduction mechanism (not shown).

A spur gear 120 (2, 15) keyed to the shaft 119 drivingly engages the gear 111 of the main cylinder or roll 37, and the gear 111 in turn drives the remainder of the gears 112–117 in a manner which will be apparent.

A manually operated linkage means which concurrently makes or breaks ink-transferring engagement between the main roll 37 and the two plate cylinders 108 and 109 and between the plate cylinders 108 and 109 and their associated form rolls 106 and 107, is shown in FIGURES 1, 4, 9, and 10–15.

The linkage means includes the carrier frames 98 and 99. The carrier frame 98 mounts the first fountain roll 104, the first form roll 106 and the first plate-carrying cylinder or roll 108 in a manner to be more particularly described below. The first carrier frame 98 is itself pivoted to the side support plates 58 and 97 at pivot connections 121 (1, 4, 15).

The second carrier frame 99 mounts the second fountain roll 105, the second form roll 107 and the second plate-carrying cylinder or roll 109. The second carrier frame 99 is itself pivoted to the side support plates 58 and 97 at pivot connections 122 (1, 4, 15).

The linkage means for concurrently establishing and disestablishing ink-transferring entrained relationship also includes four cranking linkages each directly associated with its own one of the form rolls 106 and 107 and plate-carrying cylinders or rolls 108 and 109. The cranking linkage associated with the plate-carrying cylinder or roll 108 includes an input moment arm element which in the particular apparatus described comprises a lever arm 123 (4, 9, 10, 15) which establishes the moment arm 124 (9, 10, 15). The cranking linkage also includes an output moment arm element which in the particular apparatus illustrated comprises the relevant portion of the body of a shaft 125 (9, 10, 11, 15) which is affixed to, but off-center from, a bellcrank shaft 126 (9, 10, 11, 15) to define therewith an output moment arm 127 (9, 10, 11, 15). The portion of the shaft 125 radially exterior of the moment arm 127 constitutes a shifting shaft means, the central axis of which is parallel to the axis of the bellcrank shaft 126 and which is spaced therefrom the distance of the output moment arm 127.

The cranking linkage associated with the first form roll 106 includes an input arm element, which in the particular apparatus described, comprises a lever 128 (4, 12, 13, 15) which establishes the moment arm 129 (12, 13, 15). The cranking linkage also includes an output moment arm element, which in the particular apparatus illustrated comprises the relevant portion of the body of a shaft 130 (12, 13, 15) which is affixed but off-center from a bellcrank shaft 131 (12, 13, 15) to define therewith an output moment arm 132 (12, 13, 15). A portion of the shaft 130 radially exterior of the moment arm 132 constitutes a shifting shaft means, the central axis of which is parallel to the axis of the bellcrank shaft 131 and which is spaced therefrom the distance of the output moment arm 132.

The cranking linkage associated with the plate-carrying cylinder or roll 109 is generally similar to that described above in connection with plate-carrying cylinder or roll 108 but is oriented differently as appropriate to the lower position of the plate-carrying cylinder or roll 109 as will be apparent from the drawings. It includes elements 133, 135, and 136 (4, 15) which correspond to the elements 123, 125, and 126 as above described. It also constitutes, respectively, input and output moment arms 134 (15) and 137 (15) which correspond to the moment arms 124 and 127.

The cranking linkage associated with the second form roll 107 is generally similar to that described above in connection with the first form roll 106, but it is oriented differently as appropriate to the lower position of the form roll 107 as will be apparent from the drawings. It includes elements 138 (15), 140 (15), and 141 (15) which correspond to the elements 128, 130, and 131 as above described. It also constitutes, respectively, input and output moment arms 139 (15) and 142 (15) which correspond to the moment arms 129 and 132.

Pivot links 143 (1, 4, 10) are provided journaling the bellcrank shafts 126 which are directly associated with the first plate-carrying cylinder or roll 108. As seen in the drawings, the links 143 are pivoted to the side support plates 58 and 97.

Pivot links (1, 4) are provided journaling the bellcrank shafts 136 which are directly associated with the second plate-carrying cylinder or roll 109. As seen in the drawings, and links 144 are pivoted to the side support plates 58 and 97.

Pivot links 145 (4, 12, 13, 15) and 146 (14) are provided journaling the bellcrank shafts 131 which are directly associated with the first form roll 106. As seen in the drawing, the links 145 and 146 are journaled to the first carrier frame 98 on an axis intermediate the axes of the first plate-carrying cylinder or roll 108 and the shifting shaft 130 directly associated with the first form roll 106.

Link means including a link 147 (15) and the corresponding link at the opposite end of the associated roll (and not seen in the drawings but corresponding to the link 146 of the upper form roll 106) are provided journaling the bellcrank shafts 141 which are directly associated with the second or lower form roll 107. As seen in the drawings, this link means is journaled to the second carrier frame 99 on an axis intermediate the axes of the second plate-carrying cylinder or roll 109 and the shifting shaft 140 directly associated with the second form roll 107.

Springs 148 (4, 12, 13, 14) are provided urging the links 145 and 146 to pivot toward the first fountain roll 104, and springs (not shown) are also provided urging the link 147 and the corresponding pivot link at the other end of the form roll 107 to pivot toward the second fountain roll 105. As seen in the drawings, the springs 148 are fixed to hooks 149 (4, 12, 13, 14) and the hooks 149 are each adjustably fixed to the first end plates 100 and 101 of the carrier frame 98 so that the tension of the springs 148 may be adjusted. The springs (not shown) on the second carrier frame 99 are also fixed to hooks (not shown) and these hooks are similarly fixed to the second carrier frame 99.

The linkage means for concurrently establishing and disestablishing ink-transferring entrained relationship also includes a controller linkage system comprising a plurality of controller members 150 (4, 9, 10), 151 (4, 12, 13), 152 (4), and 153 (4), each associated with its own one of lever arms 123, 128, 133, and 138, respectively, for co-axial oscillatory movement therewith. Each lever arm 123, 128, 133, and 138 is fixed to its one of bellcrank shafts 126, 131, 136, and 141. Lower adjusting blocks 154 (1, 4, 9, 10), 55 (1, 4, 12, 13), 156 (1, 4), and 157 (1) are pivoted to the distal end of its own lever arm 123, 128, 133 and 138, respectively, and each of the blocks 154–157 is provided with a threaded bore 158 (10,13). Upper adjusting blocks 159 (1, 4, 9, 10), 160 (1, 4, 12, 13), 161 (1, 4) and 162 (1) are pivoted to its own one of controller members 150–153, respectively, and each of the blocks 159–162 is provided with a threaded bore 163 (10, 13). Threaded connector pins 164 (1, 4, 9, 10), 165 (1, 4, 12,-13), 166 (1, 4), and 167 (1) extend through each pair of threaded bores 158 and 163 to adjustably connect each set of associated upper and lower adjusting blocks 159 and 154, 160 and 155, 161 and 156, and 162 and 157. Each threaded connector pin has a head portion 168 (4, 9, 10, 12, 13) which is provided with a multiplicity of notches 169 (4, 9, 10, 12, 13). A spring clip 170 (4, 9, 10, 12, 13) is pinned to each upper adjusting block 159–162 and has a pawl 171 (10, 13) which engages the notches 169 on each head portion 168. A desired angular relationship is established between each lever arm 123, 128, 133, and 138 and its associated controller member 150–153 by turning a threaded connector pin 164–167, and this relationship is maintained by cooperation between each pawl 171 and a notch 169 on each head portion. The pins 164–167 will be seen to constitute adjustable connector means for interconnecting each controller member 150–153 and its associated input moment arm elements 124, 129, 134, or 139 at an almost infinite variety of relative angular positions. These relative angular positions are chosen to establish the desired degree of bias between their associated roll and the succeeding roll in the train at the fully "on" position of the controller linkage system.

Figure 4:
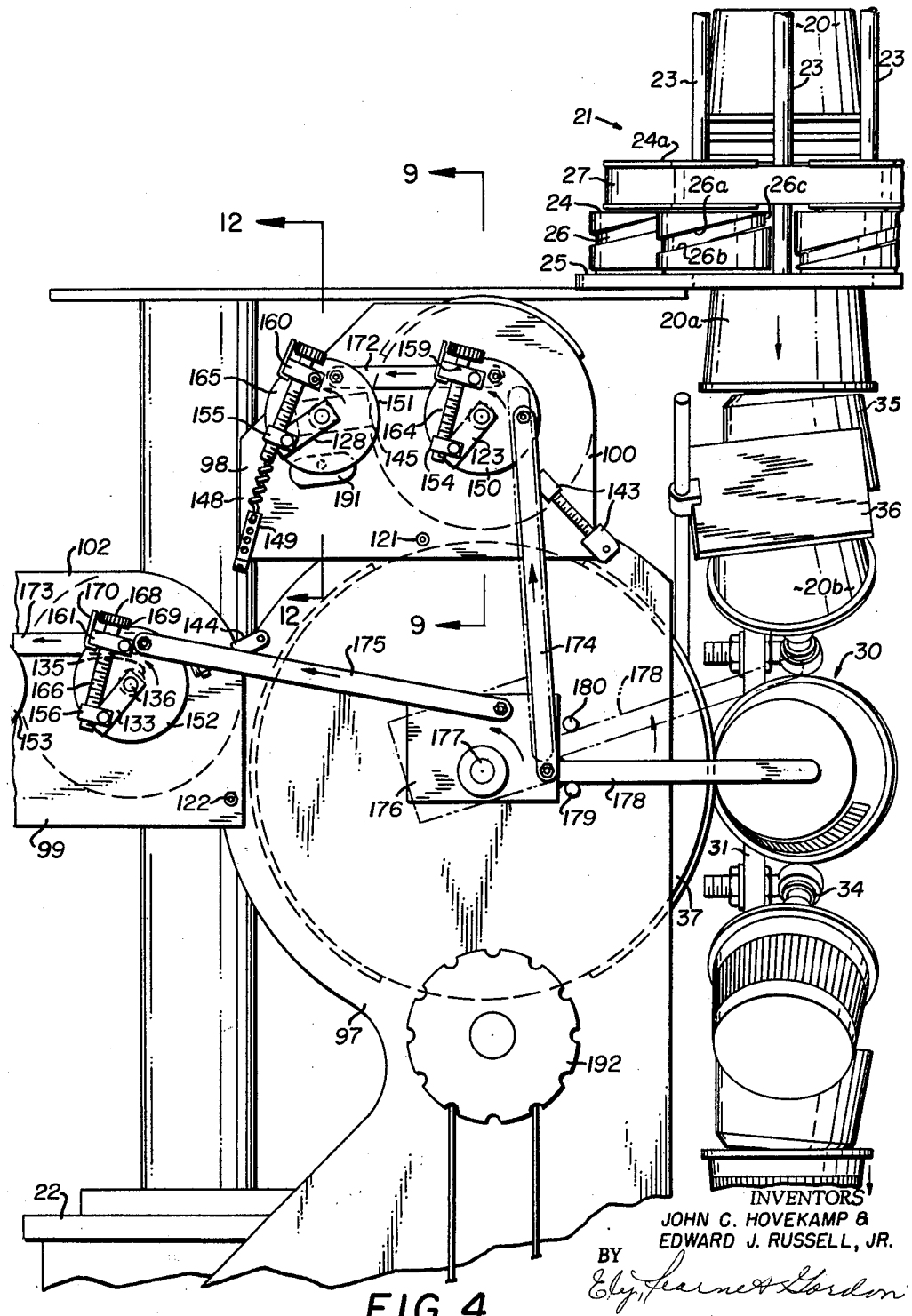
FIGURE 4 is a partial side elevation of the apparatus illustrated in FIGURE 1.

The controller members 150–153 are actuated by additional means in the controller linkage system, such additional means including a linkage system having links 172 (4,13) and 173 (4) connected between the controller members 150 and 151 and between the members 152 and 153, respectively, links 174 (4) and 175 (4) connected to the members 150 and 152, respectively, and control actuating means which, in the illustrated apparatus, comprises an actuating plate 176 (1, 4) journaled for rotation about a shaft 177 (1, 4) associated with the main roll 37 and comprises an "off-on" actuating lever 178 (1, 4) which is fixed to the actuating plate 176. The link 172 is pivotally connected at either end to the controller members 150 and 151, and the link 173 is pivotally connected at either end to the controller members 152 and 153. The links 174 and 175 are each pivotally connected at one end to the actuating plate 176, the other end of the link 174 being pivotally connected to the controller member 150 and the other end of the link 175 being connected to the controller member 152. In FIGURE 4, the parts are illustrated in the "on" position with the actuating lever 178 engaging a lower stop member 179. Also in FIGURE 4, the parts are illustrated by phantom lines in the "off" position with the actuating lever 178 engaging an upper stop member 180. As the lever 178 is manually moved from the "on" position to the "off" position, the actuating plate 176, the links 172–175, and the controller members 150–153 are all moved in the directions indicated by the arrows to disestablish ink-transferring entrained relationship. A particularly advantageous feature of this aspect of the invention is that the ink-transferring entrained relationship may be positively established and disestablished between two fixed position. When the actuating lever 178 is manually moved alternately between an abutting relationship with the upper stop member 180 and an abutting relationship with the lower stop member 179, the entrained and disentrained relationship which are alternately established will not vary.

Figure 10:
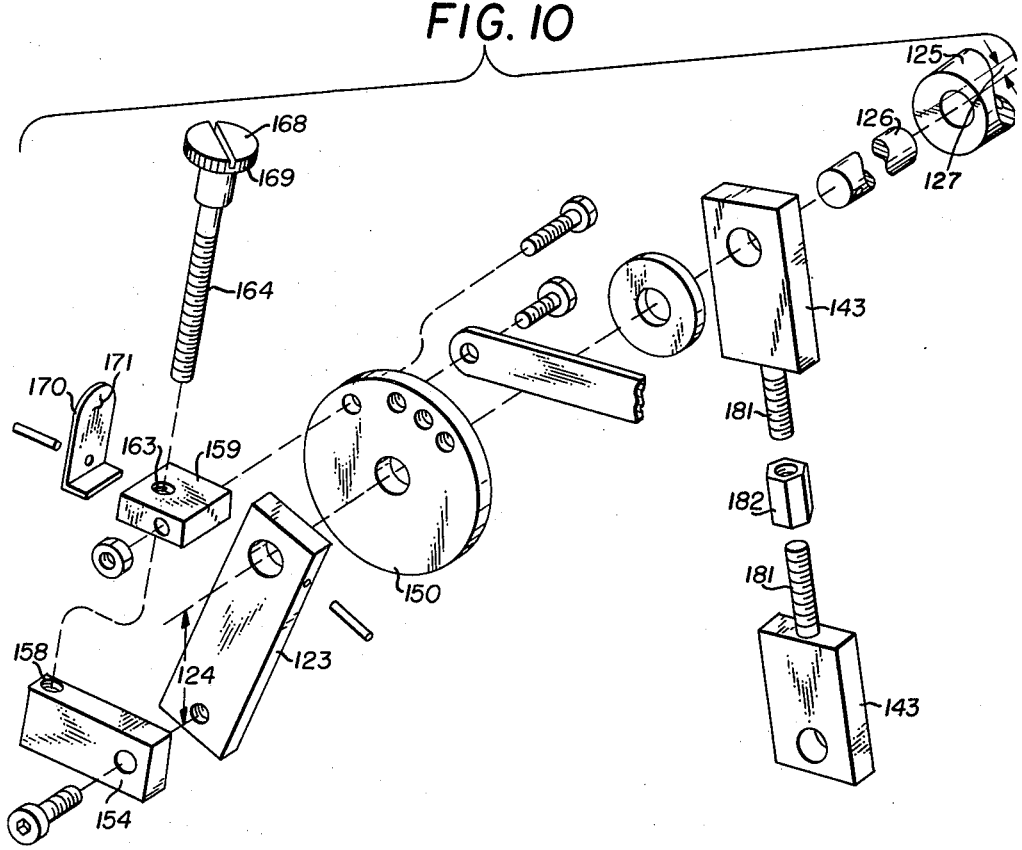
FIGURE 10 is an exploded view of the majority of the elements shown in FIGURE 9.
Figure 12:
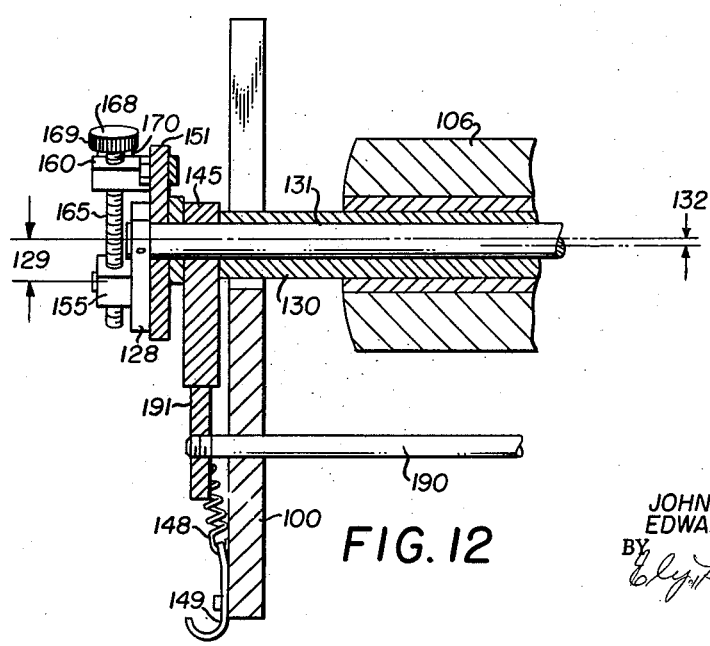
FIGURE 12 is a fragmentary cross-sectional detail view taken from the line 12—12 of FIGURE 4.
Figure 13:
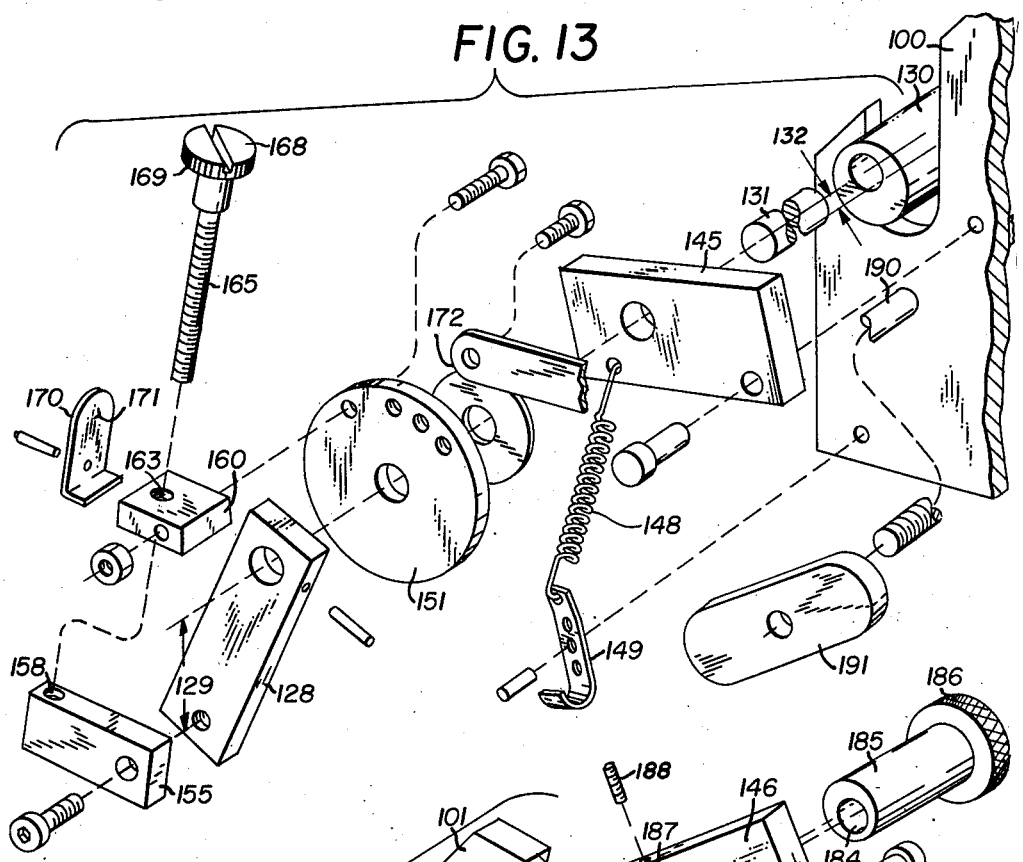
FIGURE 13 is an exploded view of the majority of the elements shown in FIGURE 12.
Figure 14:
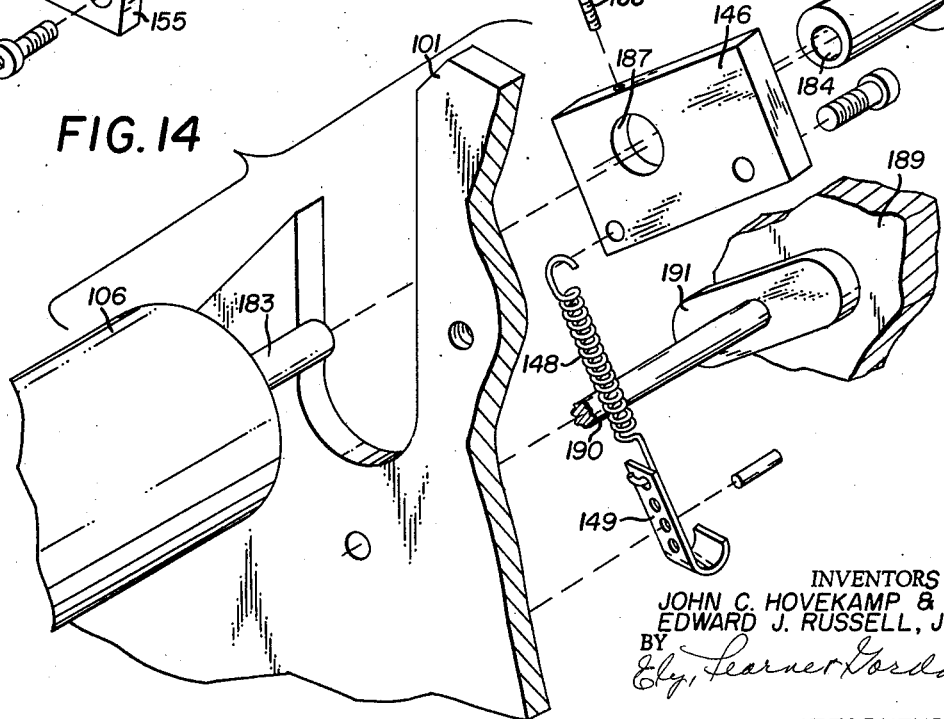
FIGURE 14 is an exploded view showing apparatus associated with the same roll as is the apparatus shown in FIGURES 12 and 13, the apparatus of FIGURE 14 being located at the opposite end of the roll from the apparatus of FIGURES 12 and 13.
Figure 15:
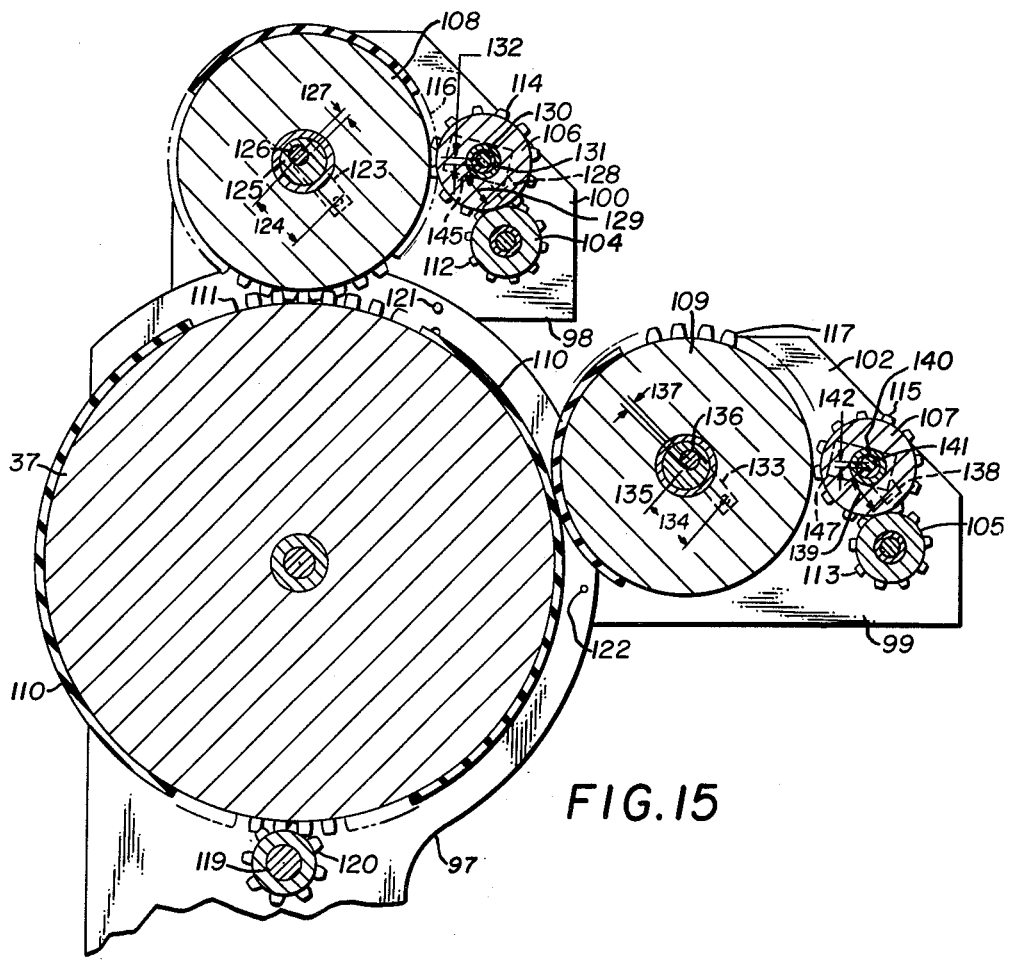
FIGURE 15 is a cross-sectional detail view taken from the line 15—15 of FIGURE 2.

Means are provided for adjustably aligning the several rolls in parallelism with each other. In this connection, the pivot links 143 and 144 are provided with turnbuckle arrangements or the like for adjusting the links thereof to slightly adjust the axial alignment of their corresponding rolls. Shown in FIGURE 10 are a pair of the screw studs 181 included as parts of link 143. These screw studs 181 are reversed threaded and are threadedly engaged with the nut 182 whereby turning of the nut 182 adjusts the length of the link 143 in a well known manner.

Adjustment of the parallelism of the form rolls 106 and 107 is accomplished by eccentrics mounted in association with the pivot links 146 associated with the upper form roll 106 and the corresponding pivot link (not shown) associated with the lower roll 107 at the right end thereof as these rolls are viewed, but not seen, in FIGURE 1.

At the right end of the form roll 106 as viewed, but not seen, in FIGURE 1 is provided a roll shaft 183 (14) rotatably received in a hole 184 which is drilled in off-center relation in a stud 185 having a knurled head 186. The stud 185 is rotatably received in the bore 187 formed in the pivot link 146. The stud 185 is adapted to be held in rotatably adjusted position by a set screw 188. It will be understood that varying the rotative position of the stud 185 with respect to the pivot link 146 will vary the alignment of the axis of the roll 106 and of course this alignment is adjusted so that the roll 106 is parallel to the plate-carrying cylinder or roll 108 when the rolls are in entrained relation. Normally, it will be desirable previously to align the roll 108 by means of manipulation of the nut 182 to bring the axis of the roll 108 into parallelism with the main roll 37.

The particular inking mechanism for supplying ink to the form rolls 106 and 107 for subsequent transfer to the cup or container surface to be printed depends primarily upon the type of ink employed. If the ink is liquid or relatively non-viscous, the ink supply is carried by ink trays (not shown) supported on each carrier frame beneath the fountain rolls 104 and 105. If the ink is paste-type or relatively viscous, the ink is fed by gravity from a paste-ink roller-fountain combination (not shown) to and through an ink feed roll train (not shown) comprising a reciprocating doctor roll, an oscillating roll, and then to the form rolls 106 and 107. The fountain rolls 104 and 105 may be provided in the paste-ink arrangement although these rolls would not be in the ink-transferring train. In this instance the fountain rolls would act as doctor rolls on the form rolls to insure a smooth and even application of paste ink on the form rolls. Both of these inking systems are well known in the art and will not be described in detail.

During shutdown of the apparatus, it is desirable to provide lifter members for assuring separation of all the rolls. To this end there is provided a lifter knob 189 (14) which rotates a shaft 190 rotatably received in the side plates 100 and 101 on which are keyed a pair of lifter members 191 (12, 13, 14) which are adapted to engage and cam upwardly the pivot links 145 and 146. The second carrier frame 99 and its associated form roll 107 is provided with a similar, lifter mechanism. To this end a similar knob (not shown) is provided associated with a shaft (not shown) corresponding to the shaft 190 and is provided with lifter members (not shown) corresponding to the lifter members 191.

In adjusting the several portions of the apparatus and in placing and registering plates, it is desirable to be able to manually rotate the several rolls. To this end there is provided a manual wheel 192 (1, 4) at one end of the shaft 119.

When the apparatus is properly adjusted and running, ink of two different colors is offset from plates of the typographic type carried on the rolls 106 and 107 to the cylindrical ink-transfer resilient surface 110 of the main roll 37. A cup or container dwelling at an indexed position at the printing station is momentarily engaged with the surface 110 of the roll 37 to be momentarily rotatably driven thereby and to receive an imprint of the inks offset on such surface 110 from the rolls 106 and 107. The designs or letters, characters, or other symbols transferred respectively from the rolls 106 and 107 to the roll 37 are out of register with each other in order to accomplish an imprint design of two distinct colors.

The invention is not restricted to the slavish imitation of each and every one of the details described above which have been set forth merely by way of example with the intent of most clearly setting forth the teaching of the invention. Obviously devices may be provided which change, eliminate, or add certain specific details without departing from the invention.

What is claimed is:

1. A decorating apparatus comprising, in combination, (1) a decorating roll, (2) an indexing turret including a plurality of workpiece arbors which successively dwell at (a) a workpiece feeding station, (b) a workpiece printing station adjacent said decorating roll, and (c) a workpiece discharge station, (3) biasing means on each of said arbors urging said arbors toward rolling linear contact with the pattern bearing surface of said decorating roll when said arbors are at said workpiece printing station, (4) sensing means for detecting the presence of a workpiece on each of said arbors prior to its arrival at said workpiece printing station, (5) linkage means responsive to said sensing means, which, when one of said arbors between said workpiece feeding station and said workpiece printing station is empty, will move said one arbor against said biasing means away from said pattern bearing surface of said decorating roll prior to the arrival of said arbor at said printing station, and (6) means at said discharge station for removing and conveying workpieces from said arbors to a position remote from said discharge station.

2. A decorating apparatus comprising, in combination, (1) a decorating roll, (2) an indexing turret including a plurality of workpiece arbors which successively dwell at (a) a workpiece feeding station, (b) a workpiece printing station adjacent said decorating roll, and (c) a workpiece discharge station, (3) biasing means on each of said arbors urging said arbors toward rolling linear contact with the pattern bearing surface of said decorating roll when said arbors are at said workpiece printing station, (4) sensing means for detecting the presence of a workpiece on an arbor prior to the arrival of said arbor at said printing station, said sensing means having (a) a first position at which a workpiece is on said arbor and (b) a second position at which said arbor is empty, (5) linkage means responsive to the said second position of said sensing means for causing said empty arbor to move away from said decorating roll prior to its arrival at said printing station, and (6) means at said discharge station for removing and conveying decorated workpieces from said arbors to a position remote from said discharge station.

3. A decorating apparatus comprising, in combination, (1) a decorating roll, (2) an indexing turret including a plurality of workpiece arbors which successively dwell at (a) a workpiece feeding station, (b) a workpiece printing station adjacent said decorating roll, and (c) a workpiece discharge station, (3) means at said workpiece feeding station for intermittently feeding workpieces from a stack to each of said arbors as they successively dwell at said feeding station, (4) biasing means on each of said arbors urging said arbors toward rolling linear contact with said pattern bearing surface of said decorating roll when said arbors are at said workpiece printing station, (5) sensing means for detecting the presence of a workpiece on each of said arbors prior to its arrival at said workpiece printing station, (6) linkage means responsive to said sensing means, which, when one of said arbors is empty, will move said one arbor against said biasing means away from said pattern bearing surface of said decorating roll prior to the arrival of said arbor at said printing station, and (7) means at said discharge station for removing and conveying workpieces from said arbors to a position remote from said discharge station.

4. The decorating apparatus of claim 3 for decorating workpieces having laterally extending lips wherein said means at said workpiece feeding station comprises a chute for receiving stacked workpieces, a plurality of rotary feed members driven intermittently in synchronism with each other and with the indexing of said arbor, and having downwardly extending helical surfaces for engaging a first side of the lip on one of said workpieces, said engagement being through the sides of said chute to propel the lowermost workpiece of said stack downwardly, each feed member having an upwardly facing surface for supporting the opposed side of the lip on a succeeding workpiece before the first side thereof is engaged by the downwardly extending helical surface of said rotary feed members.

5. A decorating apparatus comprising, in combination, (1) a decorating roll, (2) an indexing turret including a plurality of workpiece arbors which successively dwell at (a) a workpiece feeding station, (b) a workpiece printing station adjacent said decorating roll, and (c) a workpiece discharge station, each of said arbors including a first shaft rotatably mounted on said turret and a second arbor supporting shaft eccentrically circumjacent the first shaft, the axis of said first shaft being spaced apart from the axis of said second shaft whereby rotation of the second shaft varies the distance between its axis and the pattern bearing surface of said decorating roll (3) biasing means urging said second shaft to a position relative to the said first shaft at which the distance between the axis of said second shaft and said pattern bearing surface of said decorating roll is at a minimum, (4) sensing means for detecting the presence of a workpiece on each of said arbors prior to its arrival at said workpiece printing station, (5) linkage means responsive to said sensing means, which, when one of said arbors is empty, will rotate said second shaft against said biasing means, causing the distance between the axis of said second shaft and said pattern bearing surface to increase prior to the arrival of said arbor at said printing station and thus prevent contact between said arbor and said surface, and (6) means at said discharge station for removing and conveying workpieces on said arbors to a position remote from said discharge station.

6. The decorating apparatus of claim 1 wherein said conveying means comprises a pair of spaced apart parallel belts extending from said discharge station to said remote position, said belts having opposed inner edge portions which engage the sidewalls of workpieces carried therebetween, and means driving said belts at different speeds, the vector sum of said speeds being in a direction away from said discharge station.

7. The decorating apparatus of claim 1 including means at said discharge station for removing workpieces from said arbors and wherein the means for conveying workpieces from said discharge station includes a pair of spaced apart parallel belts with opposed inner edges engaging the sidewalls of said workpieces, said belts driven at different speeds such that the workpieces therebetween are turned by the relative movement between said belts, the vector sum of the speed of said belts being in a direction away from said discharge station, and means for drying the decorated sidewalls of such workpieces turning between said belts, said drying means including air jets adjacent said belts, said jets directed towards the path of such workpieces as they revolvingly travel along said conveyor.

8. An apparatus for decoration of annular workpieces comprising, in combination, a decorating roll, means for supplying a decorative pattern to said decorating roll for offset printing therefrom, a periodically indexing turret including a plurality of radially extending arbors for conveying workpieces to and from the decorating roll which sequentially dwell at a workpiece feeding station, a workpiece printing station located at said decorating roll, and a workpiece discharge station, means at said workpiece feeding station for intermittently feeding workpieces upon arbors successively dwelling at said feeding station, biasing means on each arbor for biasing said arbors and workpieces supported thereon towards linear rolling contact with said decorating roll at said printing station, sensing means for detecing the presence of a workpiece on each of said arbors prior to its arrival at said workpiece printing station, linkage means responsive to said sensing means, which, when one of said arbors is empty, will move said one arbor against said biasing means and away from said pattern bearing surface of said decorating roll prior to the arrival of said one arbor at said printing station, and means at said workpiece discharge station for removing said workpieces from arbors successively dwelling at said discharge station, and means for conveying said workpieces to a position remote from said discharge station.

9. The decorating apparatus of claim 8 wherein the conveyor means comprises a pair of spaced apart parallel belts extending from said discharge station to said remote position, said belts having opposed inner edge portions which engage the sidewalls of workpieces therebetween, and, means driving said belts at different speeds, the vector sum of said speeds being in a direction away from said discharge station.

10. The decorating apparatus of claim 8 including means at said discharge station for removing workpieces from said arbors and wherein the means for conveying workpieces from said discharge station includes a pair of spaced apart parallel belts with opposed inner edges engaging the sidewalls of said workpieces, said belts driven at different speeds such that the workpieces therebetween are termed by the relative movement between said belts, the vector sum of the speed of said belts being in a direction away from said discharge station, and means for drying the decorated sidewalls of such workpieces turning between said belts, said drying means including air jets adjacent said belts, said jets directed towards the path of such workpieces as they revolvingly travel along said conveyor.

References Cited by the Examiner

UNITED STATES PATENTS

| | | | |
|---|---|---|---|
| 937,267 | 10/09 | Spalckhaver | 101—352 |
| 2,195,625 | 4/40 | Knaggs | 101—38 |
| 2,331,991 | 10/43 | McElwain | 101—38 |
| 2,425,928 | 8/47 | Emerson | 101—38 |
| 2,764,933 | 10/56 | Hargrave | 101—38 |
| 2,875,685 | 3/59 | Hendry | 101—40 |

EUGENE R. CAPOZIO, *Primary Examiner.*